No. 766,227. PATENTED AUG. 2, 1904.
W. W. DOOLITTLE.
MACHINE FOR ATTACHING FLANGES TO TUBES.
APPLICATION FILED JAN. 22, 1903.
NO MODEL. 5 SHEETS—SHEET 2.
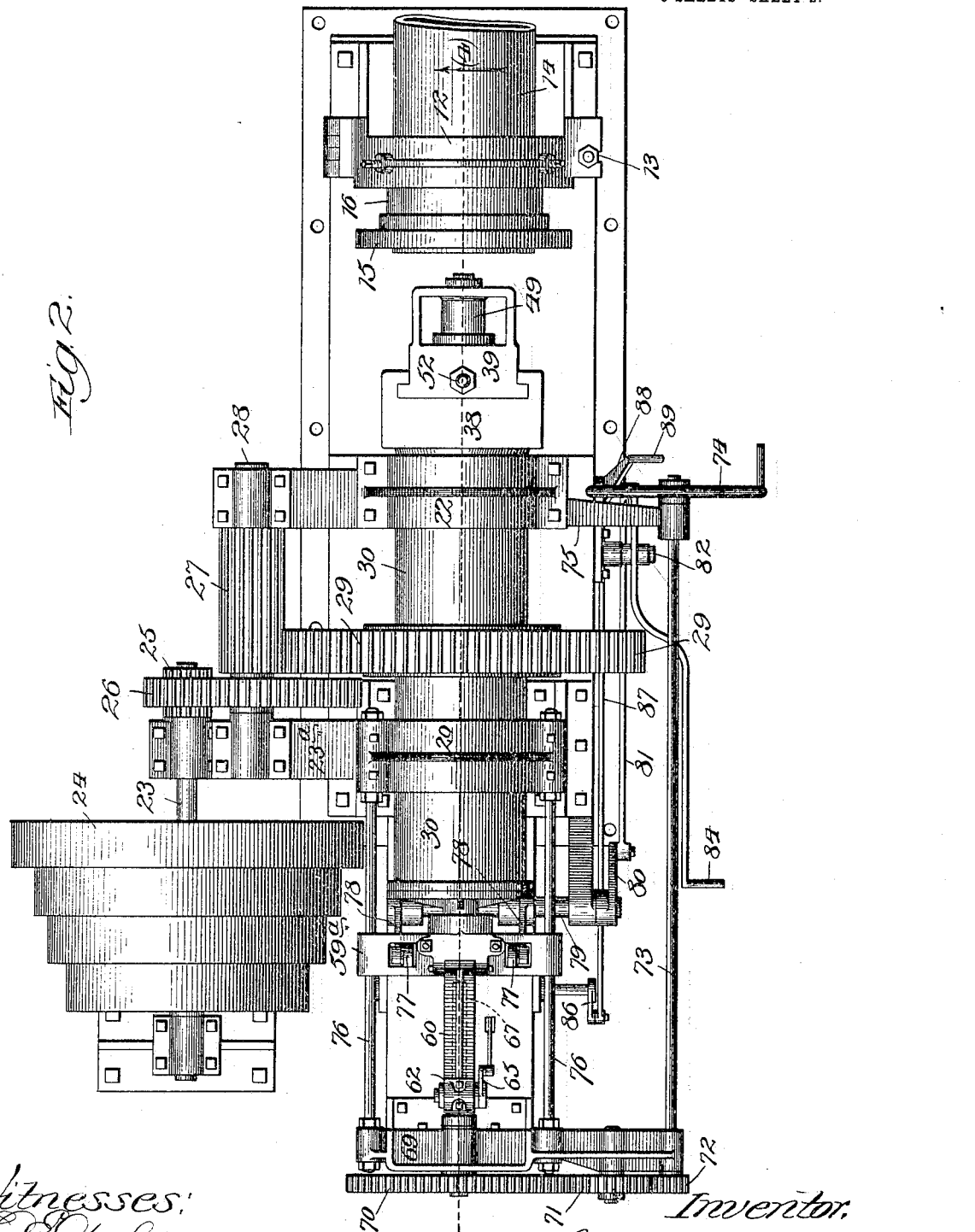

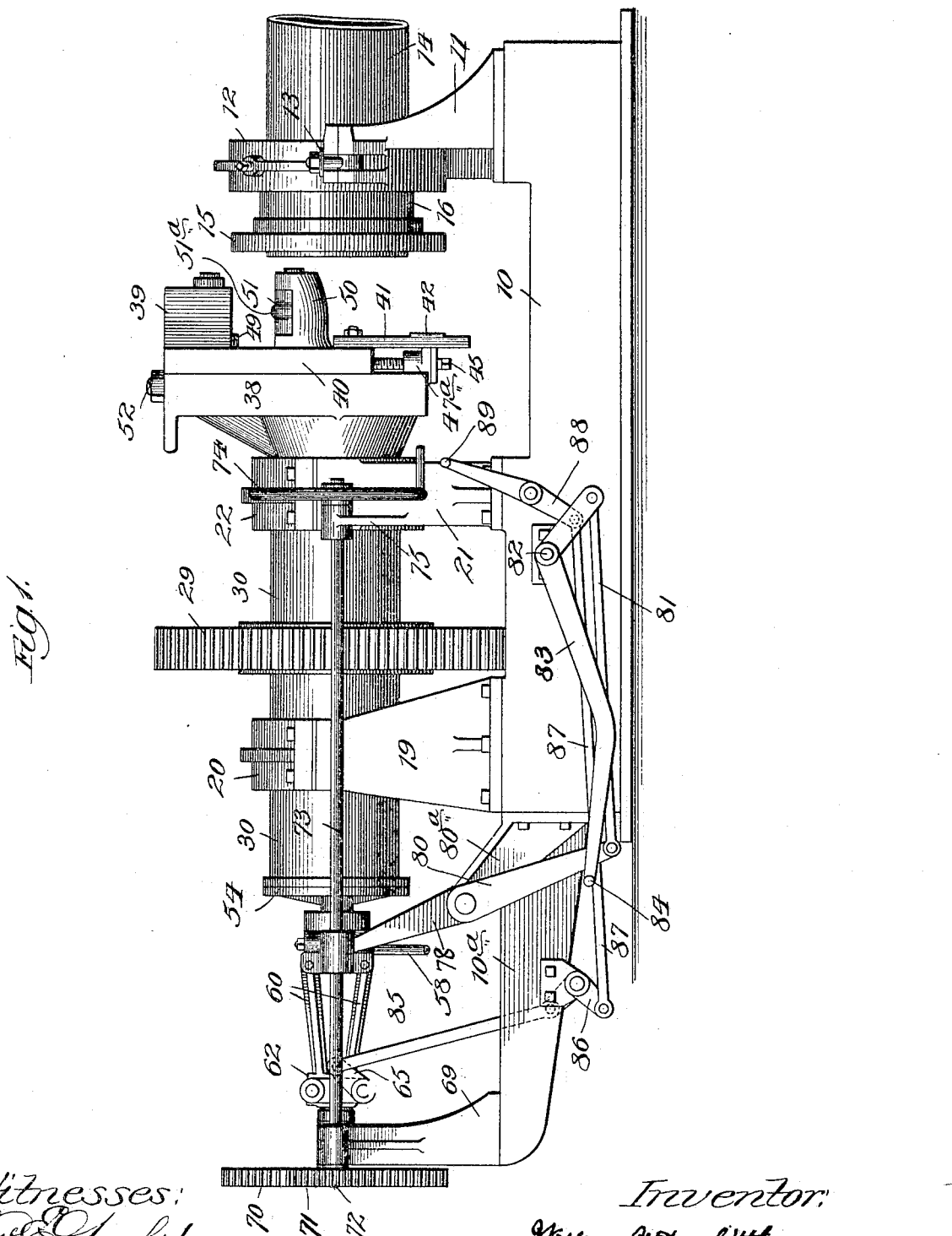

No. 766,227. PATENTED AUG. 2, 1904.
W. W. DOOLITTLE.
MACHINE FOR ATTACHING FLANGES TO TUBES.
APPLICATION FILED JAN. 22, 1903.
NO MODEL. 5 SHEETS—SHEET 3.
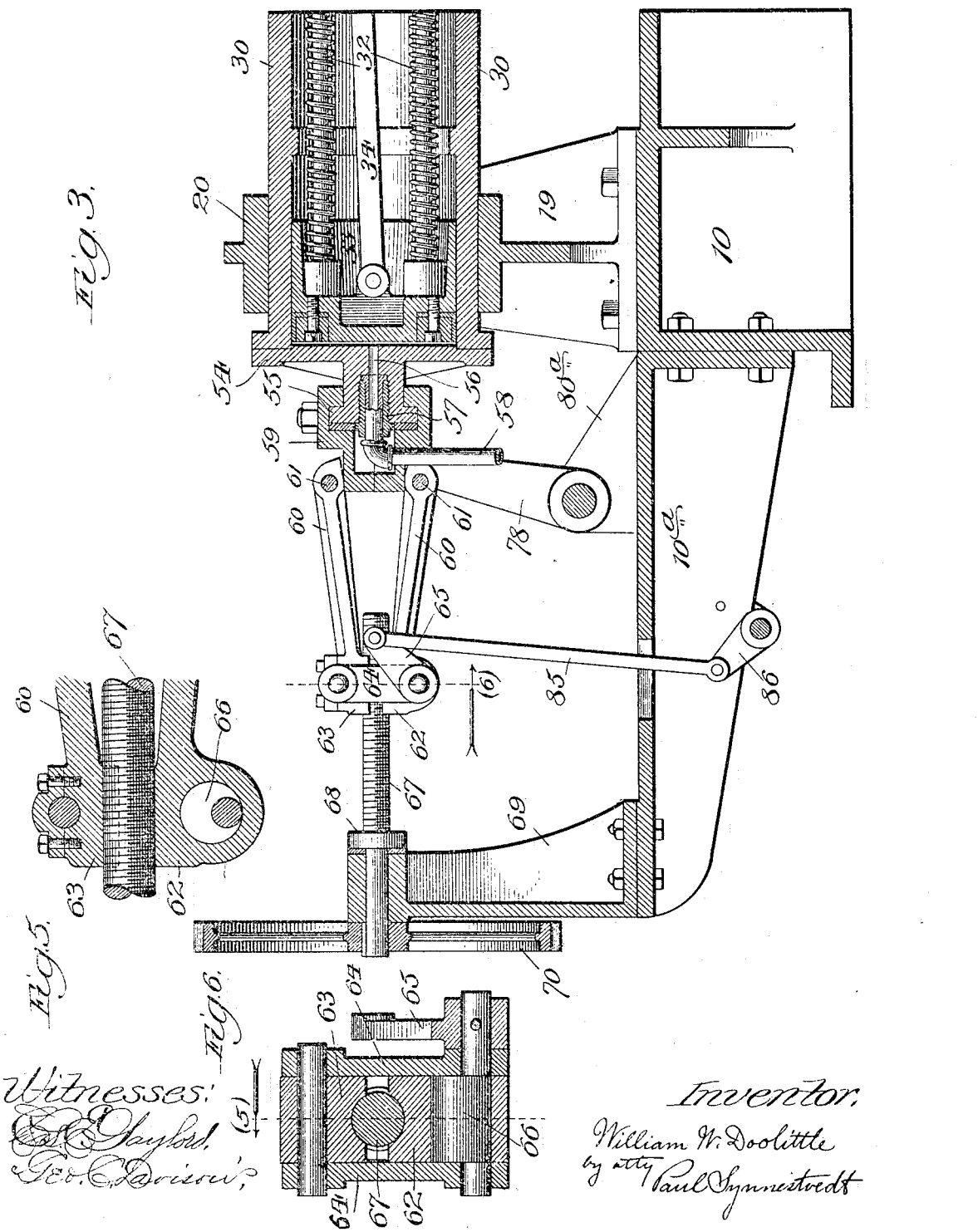
Witnesses:
Inventor:
William W. Doolittle
by atty Paul Synnestvedt

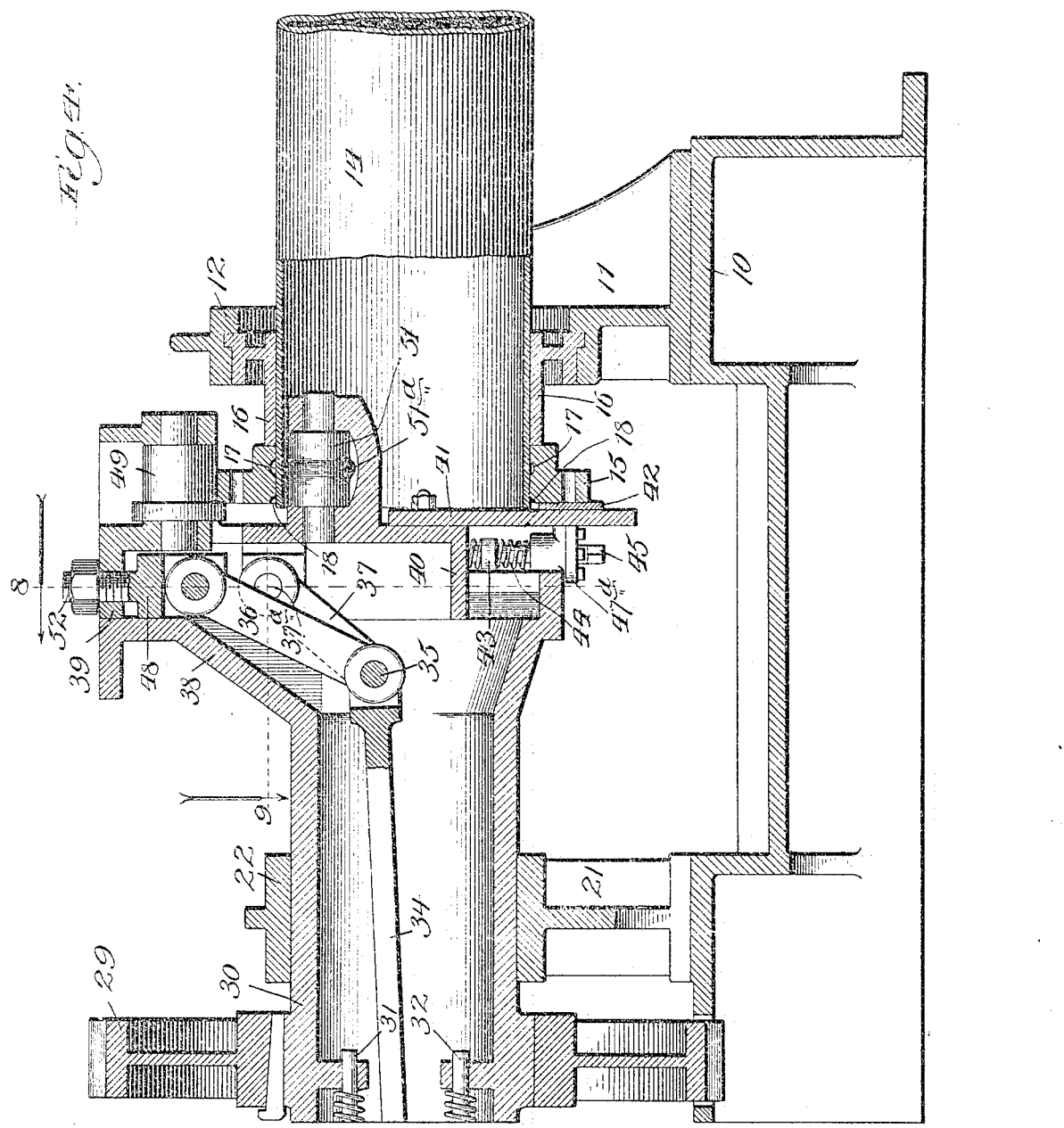

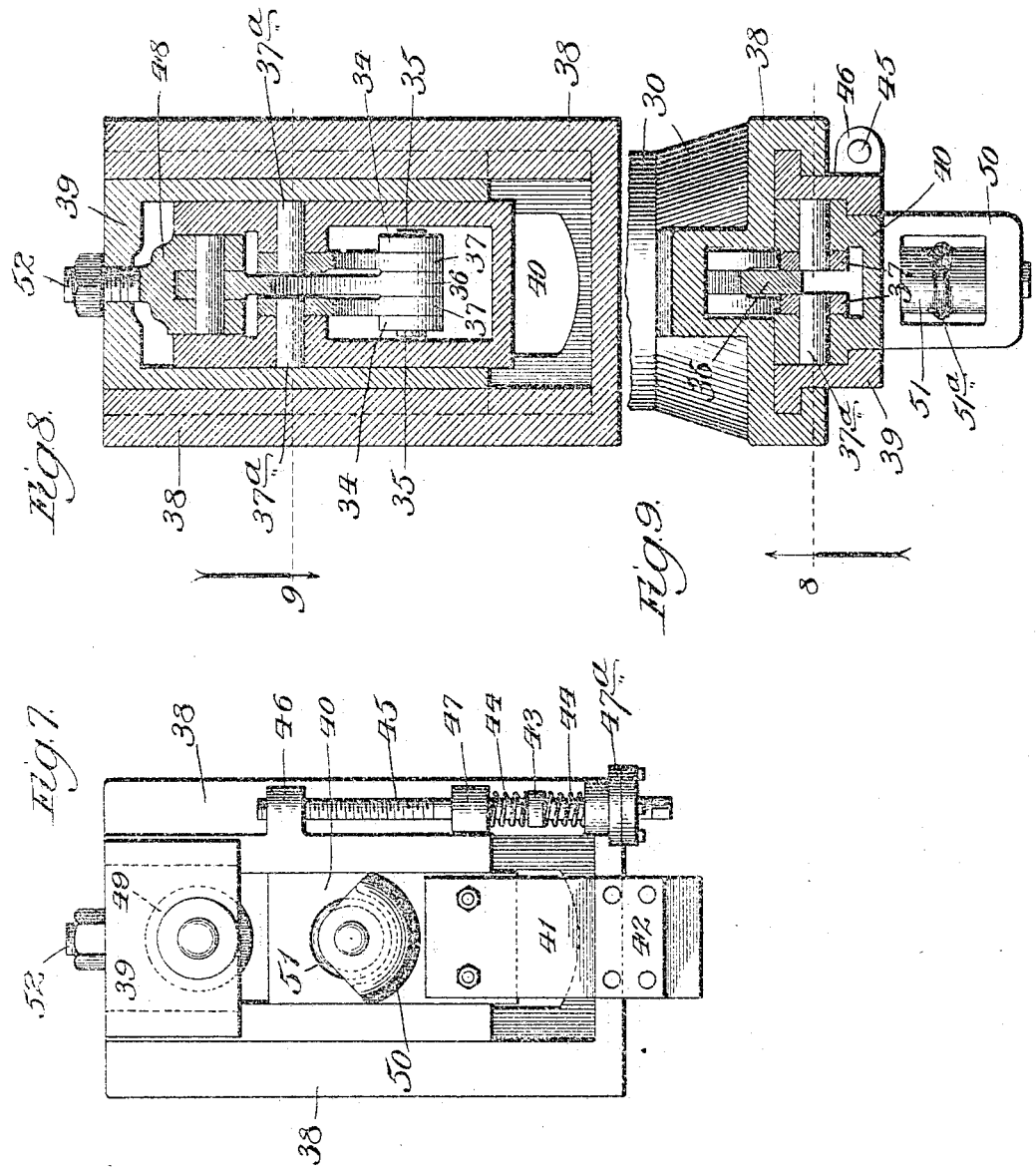

No. 766,227.                                                                                              Patented August 2, 1904.

UNITED STATES PATENT OFFICE.

WILLIAM W. DOOLITTLE, OF CHICAGO, ILLINOIS, ASSIGNOR TO CRANE COMPANY, OF CHICAGO, ILLINOIS, A CORPORATION OF ILLINOIS.

MACHINE FOR ATTACHING FLANGES TO TUBES.

SPECIFICATION forming part of Letters Patent No. 766,227, dated August 2, 1904.

Application filed January 22, 1903. Serial No. 140,154. (No model.)

*To all whom it may concern:*

Be it known that I, WILLIAM W. DOOLITTLE, a citizen of the United States of America, residing at Chicago, in the county of Cook and State of Illinois, have invented a certain new and useful Machine for Attaching Flanges to Tubes, of which the following is a specification.

My invention relates generally to the metal bending and shaping art, and in particular to that class of machines which are used for shaping metal pipes and butt flanges to fit together and make a water-tight joint. The objects of my invention are, first, to provide a machine which may operate to make a circumferential bead in such sheet metal as that used in making pipe; second, to provide a machine for fixing flanges on the ends of pipe or metal tubes; third, to provide a machine for rolling down the metal of a pipe into a circumferential groove provided in the flange or head to be attached to the pipe; fourth, to provide a machine for such purpose in which the thrust and resistance thereto in bending the metal will be carried directly upon an independent part of the machine, and not upon the working bearing of the rotating part; fifth, to provide a rolling device which may follow around a tube and flange for the purpose of rolling the metal into a groove of the flange, and which is movable to accommodate irregularities in the circumferential form of said tube and flange; sixth, to provide a special circumferential rolling device which is easily shifted in and out of position for the operation; seventh, to provide a flange attaching machine in which the pressure necessary to bend the metal is induced by air pressure operating upon links and levers, and inducing no bending strain in the moving parts of the machine; eighth, to provide a machine for rolling circumferential indentations which may conveniently be inserted and withdrawn from position for the operation, gradually, by means of a screw; ninth, to provide a machine of the type specified which has ready and easy adjustment in working distance from the center of rotation, and also easy and ready adjustment between the compression parts of the machine; tenth, to provide a novel and useful mechanical motion for the purpose of reciprocating pressure rolls to and from each other by fluid pressure. The invention is also intended to provide convenient means for carrying out a certain process of attaching flanges to tubes, as set forth in my co-pending application No. 74,199, which consists in a general way in indenting the metal of the tube into annular recesses in the flange in such a way that it will be in perfect contact therewith, and then bending the metal into a second annular groove in order that there may be induced a bending strain in the part of the metal which lies over the ridge between the two grooves.

The above objects, as well as other advantages which will hereinafter appear, I attain by means of the construction and assembling of parts as illustrated in preferred form in the accompanying drawings, wherein,—

Figure 1 is a side elevation of the whole machine.

Figure 2 is a plan view of the whole machine.

Figures 3 and 4 represent a central vertical section through the whole machine, taken along the line 3, 4, in Figure 2, each of Figures 3 and 4 being a part of said section.

Figure 5 is a central vertical section through the split nut shown on the horizontal screw in Figure 3, taken on line 5 in Figure 6.

Figure 6 is a section of the same, taken along the line marked "6" in Figure 3.

Figure 7 is a front elevation of the pressure jaws and the revolving head.

Figure 8 is a vertical section of the same, taken on line 8 shown on Figure 9.

Figure 9 is a horizontal section through said head, taken on line 9 in Figure 8.

Various attempts have been made to attach flanges of solid metal to sheet-metal tubes without the use of packing to make a water-tight joint, but so far as I am aware, none of them have succeeded, because it was impossible to attain a close contact between the metal of the tube and the flange. In my co-pending application, No. 74,199, I have set forth a process of manipulating the metal by which a certain condition of strain is induced which keeps a permanent contact between the metal of the tube and the metal of the flange; and it is for the carrying out of this process, in the main, that I have invented the apparatus herein set forth.

The pipe being clamped into place and the flange being loosely placed upon the end, the first problem is to provide that the roller which indents the metal into the circumferential grooves provided on the interior of the flange shall induce constant and equal pressure at all points of the circumference of the flange, and not be dependent upon the position of a revolving head. I have provided a machine, therefore, in which there is a rolling abutment which follows around the outside of the flange, and operating on the inside of the metal tube to indent it into the circumferential groove of the flange, I provide a roller which is held under pressure against the metal by a resilient or yielding force, and at the same time, the traveling of the outside abutment roller and the inside compression roller around the tube and flange, is made to follow exactly the contour of the tube and flange, and is independent of the circular motion of the revolving head which provides the necessary thrust for the progress of the rolls around the flange. At the same time I have provided means by which in the said progress around the circumference, while the rolls may yield together somewhat to the irregularities therein, yet the pressure upon the rollers remains always the same and the changing of position of the abutment roller does not alter the amount of pressure, nor give any wrench or bending strain to the machine in any other part.

By reference, first, to Figures 1 and 2, it will be seen that I have provided a supporting frame 10, upon which at one end is erected an upright 11, forming a support for the pipe to be operated upon. It is provided with a removable or hinged top jaw 12, which has means for clamping down upon the pipe 14, placed therein, such as the screw 13. The interior of this clamping head is provided with a ring having a projecting flange 16, which is designed to abut against the flange 15 being placed upon the tube 14, to receive the longitudinal thrust, as will be evident from Figure 4.

The frame 10 also has two other uprights 19, 21, in which is mounted a revolving cylinder 30, held in place upon its supports by means of clamping jaws, 20 and 22 respectively. The cylinder 30 is mounted practically in line with the axis of the pipe to be operated on. It is provided with a large gear wheel 29, fixed thereon, which is driven from a driving pulley 24, mounted on a shaft in the extension 23, provided with a gear pinion 25, which by means of the gear 26, and the sheaf 27 upon the shaft 28, drives the aforesaid large gear-wheel 29, and thereby rotates the cylinder 30. The cylinder 30 is closed by a cap 54 at its end, (see Figure 3), and inside is provided with a plunger 33, which operates to thrust upon a rod 34, for a purpose hereinafter described. The plunger 33 is normally kept in place at the back end of the cylinder by means of the spiral springs upon the rods 32, which are guided in holes in the lugs 31, inside of the cylinder.

The near end of the cylinder 30 is provided with a compression head which is designated as a whole by the figure 38. By reference particularly to Figures 4, 7, 8 and 9, it will be seen that this head 38 is provided with a block 39, movable in a slot, and carrying an arm having a roller 49 therein, while below, inside this block, is another sliding block 40, which has on an extension 50 a roller 51, bearing a ridge $51^a$, for the purpose of compressing the metal of the pipe into the grooves 17 and 18, (see Figure 4). These two sliding jaws, 39 and 40, carrying the rollers, are radially movable to and from each other in their radial slots in the head 38, and they are adjusted as to their relative position by means of the screw 52, in the pivot head 48, at the top of the head 38 and inside head 39, raising and lowering the block 40 relatively to block 39. This head 48 is pivoted to a link 36, which by the pin 35 is also pivoted to another, shorter, link 37, which is connected by the pivot $37^a$, to the head 40, carrying the lower roller. The motion to and from each other of the head 40 and the heads 48 and 39, is induced through these toggle links by the thrust of the rod 34 in the cylinder 30, as will be hereafter described. The block 40, which carries also the head 39, bearing the upper roller, lies vertically in the slot in the head 38, as will be observed from Figure 9, and from Figure 7 it will be seen that this sliding frame or head 40 is provided with a lug 46, in which works a screw 45, sliding loosely in lugs 47, $47^a$, attached to the actuating head 38, and bearing against these lugs are double springs 44, held in both directions on screw rod 45, by means of the block 43, fixed on this screw rod 45. The screw 45 may therefore slide easily through the lugs 47, and the relative position of the lug 46 will be determined by a position of said screw in the lug 46, while at the same time it is possible for the lugs 46, and therefore the heads 39 and 40, to slide in the slot to and from the center of motion of the head. This is for the purpose of enabling the two rollers 49 and 51 to advance and recede toward the center of rotation of the head during the process of rolling down the groove in the pipe, in order that irregularities in the periphery of the pipe and flange may not strain the machine, and in order that the pressure upon the two rollers may be always the same and not varied by reason of lack of true circular form of the surfaces into which the metal of the pipe is being rolled. It will be evident from Figure 4. that since the two links, 36 and 37, are of unequal length, the distance apart of the two pivoted ends and their respective heads 39 and 40 will depend upon the position of the block 48 in the head 39,—that is to say, the position of the screw 52 in the head 39 will determine the relative positions of the two rollers, and therefore the amount of space between the outside periphery of the flange and the inside of the circumferential groove 17 into which the roller 51 is forcing the metal of the pipe 14. In the meanwhile the position of the two rollers together is varied radially to the axis of the pipe by means of the screw 45, in order that pipe of different sizes may be operated upon by the machine.

The cylinder 30 is movable longitudinally through its bearings in the brackets 19, 21, in order to bring the jaws carrying the rollers 49, 51, into proper position to roll the metal into the grooves 17, 18. In ordinary operation, for the purpose of shifting the cylinder 30 to and fro, I have provided an extension $10^a$ of the frame 10, and an upright bracket 69, in which is mounted a screw shaft 67, which is turned by means of a gear 70, and the cooperating gears 71 and 72, which are operated by the shaft 73, mounted at its other end in the bracket 75, on the frame 21, provided with a hand wheel 74. Upon the end of the cylinder 30 is a cap 54, which rotates in a horizontally extended head 59, having arms $59^a$, and on this head 59 are pivoted two lever arms 60, which are provided at their ends with a split nut, (62, 63). The parts of this nut 62–63 are capable of being separated, in their supporting links 64, by means of the crank arm 65, turning the eccentric cam 66, which changes the position of the blocks 62 and 63. The arm 65 is operated by means of the rod 85, the arm 86 and the rod 87, which is connected to lever 88, having a handle 89, so that when the handle 89 is moved the jaws or block 62–63 of the split nut are opened or closed. In order to insure the threads of the nut entirely disengaging from the screw 67, each of the arms 60 is provided at its back end with a spur, or stop, which prevents its motion further than a certain distance, whereupon the thrust of the cam 66 takes effect upon the other side and lifts both the nuts off the thread. This arrangement is for the purpose of moving the cylinder 30 gradually, for adjustment, and in some cases, where it is necessary, to cause the rollers 51 and 49 to progress spirally, as where a spiral groove is provided on the inside of the flange. But for the purpose of shifting the cylinder 30 rapidly or easily when it is disengaged, I have provided the arms of the cross-head 59 with two slots, in which are heads with rollers 77, on levers 78 having arms 80, which are pivoted upon the bracket $80^a$, and are connected by a rod 81, with a bell crank lever 83, pivoted at 82, and provided with a handle 84, so that when the handle 84 is raised, the lever 80 will operate to push the cylinder inward toward the pipe.

The pressure upon the rollers 49 and 51, for the purpose of pressing the metal into the annular grooves 17 and 18, is provided by means of the longitudinally shifting rod 34, inside the cylinder 30. This rod 34 is attached to the plunger 33, and is operated by means of fluid pressure, preferably compressed air, which is introduced through the port 56 in screw plug 57, which holds the end of the pipe 58 supplying the same. It will be understood that there is provided a two-way cock for the purpose of admitting and exhausting compressed air into the pipe 58. Its construction being ordinary and well known, it is unnecessary to illustrate it. The head 59 is fitted upon the projection 55 of the head 54 of the cylinder, as will be clear from Figure 3. The screw plug 57 is mounted upon the end of the pipe 58, and the latter has a flange at its end, in order that the cylinder head 54 carrying the plug 57, may turn upon the pipe in its motion, it being understood that the cross-head 59 itself does not revolve.

Ordinarily the thrust of the screw 67 against the split head 62, 63, takes effect through bars 60 directly upon the head of the cylinder 30, and in order to oppose this thrust more securely, I provide the tie-bars 73, which connect the upright bracket 69 with the main upright 19.

The construction and assembling of the parts being as above described, the operation of the machine is as follows:

A pipe 14 is placed in the jaws of the support 11, 12, as shown in Figure 1, and a loose flange for the pipe, 15, is placed upon the same and butted against the flange 16 inside the head. The flange 15 is previously provided with internal circumferential grooves, such as the two shown in Figures 4 as 17, 18, the latter of which is but a quarter round and is placed directly upon the edge of the flange for a purpose which will be hereinafter specified. The pipe and flange being stationary in position, the cylinder 30, with its revolving head 38, is brought into proper position to bring the ridge $51^a$ on the roller 51 directly opposite the first of these grooves, 17, the jaws being so adjusted as to bring them into the position shown in Figure 4, by means of the screw 45, which is held in its normal position by means of the springs 44 thereon. The roller 49 is brought upon the outward periphery of the flange 15, and in order that the distance between the interior grooves and the outer roll may be at a constant distance apart, it is preferable to turn both the grooves and the base of the flange and the outside periphery thereof for opposing the roller 49. The cylinder 30 being then in proper place, pressure is brought upon the two rollers 49, 51, by means of the plunger 33 and rod 34, which are pushed forward by the air pressure, and operate upon the links 36, 37, to draw the two heads 39, 40, together and force the rollers 49 and 51 against the flange and pipe. The machine then being started, the cylinder 30 and head 38 revolve slowly around the pipe, and the metal of the pipe is pressed tightly into the groove 17 of the flange. The air being then exhausted from behind the plunger in the cylinder 30, the rollers 49, 51, are relieved from their hold, when the cylinder 30 is withdrawn till the ridge 51$^a$ is brought directly under the circumferential groove 18 at the outer edge of the flange 15. The pressure then being brought again upon the two rollers and the machine started, the cylinder 30 is thrust forward to keep close contact of roller 51 and ridge 51$^a$, by means of the split nut 62-63 being operated by the hand-wheel 74, as heretofore described. (Of course, other means may be provided for taking up the longitudinal thrust of the ridge 51$^a$ on the side of the circumferential groove 18.) The machine then being revolved as before, the metal is pressed both outward and longitudinally into the groove 18, in the manner of common upsetting operation.

The metal of the pipe 14 being thoroughly and firmly pressed into the groove 17 at the completion of the first operation, it will be evident that as the metal is rolled into the groove 18, there will be induced in the metal of the pipe where it passes over the ridge between the two grooves in the flange, a bending strain which will, by its own elasticity, keep a close contact between the flange and the metal of the pipe on said ridge. This renders the pipe perfectly water-tight without the necessity of any packing, as set forth in my process application above referred to.

It will be understood that various modifications in the details of construction of the machine come within the scope of the invention, as where it may be convenient to hold the head 38 stationary and turn the pipe in its supports, instead of turning said head, using the link and pivoted rod means of compressing the two rollers 49, 51, as before. Other obvious modifications will occur to the mechanic.

But, having thus described my invention and illustrated its use, what I claim and desire to secure by Letters Patent, is the following:

1. In a flange attaching machine the combination with means for holding a pipe and flange in place, of a revolving head, shiftable longitudinally and provided with interior and exterior jaws carrying rollers to operate upon the said pipe and flange.

2. In a flange attaching machine the combination with means for holding a pipe, of a revolving hollow cylinder provided with a head having inside and outside compression jaws for compressing metal into grooves of a pipe and means within said cylinder for moving both said jaws radially to the cylinder.

3. In a flange attaching machine the combination of a revolving cylinder provided with a head which has two jaws provided with rollers, said rollers being moved to and from each other by means of toggle links placed within said head.

4. The combination of means for holding a pipe, a revolving cylinder having jaws for pinching said pipe placed inside and outside of said pipe, said jaws being operated by means of a link reciprocated inside the cylinder by fluid pressure.

5. A flange attaching machine provided with a revolving head carrying interior and exterior rollers, said rollers being reciprocated to and from each other by means of eccentric toggle links operated by the thrust of a fluid pressure piston.

6. In a flange attaching machine the combination with means for holding a pipe and flange in place, of a revolving head having rollers adjustable to and from each other and means whereby said rollers are driven circumferentially around said pipe and allowed to adjust themselves automatically to and from the center of rotation of said head.

7. In a flange attaching machine the combination of a revolving head having two opposed rollers on movable jaws therein, with means for inducing a thrust of said jaws against each other, and both jaws being movable together to and from the axis of rotation of said head.

8. In a flange attaching machine the combination of a revolving head mounted upon a cylinder and having movable jaws carrying opposed rollers thereon, of fluid pressure means for operating said jaws and means for shifting said cylinder, carrying the jaws to and from their working position.

9. The combination with a revolving cylinder having pressure jaws thereon of a fluid pressure driven piston in said cylinder and means whereby the motion of said piston operates the said jaws, and a screw-operated mechanism for longitudinally altering the position of said cylinder.

10. In a flange attaching machine the combination with a revolving cylinder having operating roller jaws, of a screw and a pair of arms attached to said cylinder and provided with a split nut co-operating with said screw, and means whereby said split nut may be opened or closed by a single motion of its operating lever.

11. In a flange attaching machine the combination with means for holding a pipe and a revolving head provided with two compression rolls for operating upon said pipe, of a pair of links of unequal length pivoted together at one end and their opposite ends attached respectively to two movable jaws, whereby thrusting the jointed end of said links will open and close said jaws.

12. The combination in a flange attaching machine of a revolving cylinder with a head having a radial slot therein, two blocks in said slot provided each with an extending jaw carrying a roller, said blocks being reciprocated to and fro by means of links operated by a thrust bar within said cylinder.

13. In a flange attaching machine a revolving head provided with a radial slot therein, a sliding frame in said slot and two blocks in said frame adjustable in position to and from each other, said sliding frame being provided with a lug and an adjusting screw yieldingly held in normal position by springs on said screw.

14. In a flange attaching machine the combination with a revolving cylinder having a slotted head, of two blocks carrying rollers mounted in the head, each being connected with a toggle link, said links being of unequal length and attached together upon a rod within said cylinder and operated by fluid pressure means to reciprocate said sliding blocks to and from each other.

15. In a flange attaching machine the combination with a revolving and reciprocable cylinder of a head thereon provided with sliding jaws carrying rollers, said sliding jaws being movable radially to the said cylinder and being yieldingly held by a fluid pressure at a specified distance apart by means of mechanism in said cylinder.

16. In a flange attaching machine the combination with a revolving and reciprocable cylinder of a head thereon provided with reciprocating jaws carrying rollers and yielding means within said cylinder for inducing pressure between said rollers, both said rollers being mounted in a frame which may yield radially to the said cylinder.

17. In a flange attaching machine the combination with a reciprocable and revolving head carrying an abutment roller for radially engaging the outside of the flange, of a movable roller adapted to enter inside the pipe and carrying thereon a circumferential ridge to roll the metal into circumferential grooves in said flange, and means for balancing the pressure of the inside and outside rollers against each other.

18. In a flange attaching machine, in combination with a reciprocable and revolving head, two blocks mounted for radial motion within said revolving head, a long link attached to one of said blocks and a short link attached to the other of said blocks, said two links being jointed together at their other ends and operated by a pivoted thrust link to reciprocate said blocks to and from each other.

19. The combination in a flange attaching machine of a revolving head, a pair of blocks mounted to slide radially in said head and yielding means for supporting said blocks in normal position and yielding means for reciprocating them to and from each other to induce a compression therebetween.

20. In a flange attaching machine a shifting revoluble cylinder to operate pressure rolls, a screw extending in line with said cylinder, normally independent of the cylinder, means for turning the screw, and connections on the cylinder to engage the screw to thrust the cylinder.

21. As means for operating the pressure jaws of a revolving reamer device, a pivoted thrust link, two unequal toggle links together connected to said thrust link and having their other ends respectively connected with said jaws, and means for operating the thrust link, all said mechanism being revoluble together.

22. The combination in a flange attaching machine of two sliding jaws, each having pivoted thereto a toggle link, and a pivoted thrust link attached to the other ends of both toggle links having operating means for thrusting the same.

In testimony whereof I have hereunto set my hand in the presence of the subscribed witnesses.

WILLIAM W. DOOLITTLE.

Witnesses:
PAUL SYNNESTVEDT,
PAUL CARPENTER.